United States Patent [19]
Bonar

[11] Patent Number: 5,052,368
[45] Date of Patent: Oct. 1, 1991

[54] HEAT PRODUCING TEAR STRIP CONTAINER

[76] Inventor: George Bonar, G.P.O. Box 2064, New York, N.Y. 10116

[21] Appl. No.: 552,061

[22] Filed: Jul. 13, 1990

[51] Int. Cl.⁵ .............................. A47G 23/04
[52] U.S. Cl. ................................. 126/262
[58] Field of Search ............ 126/261, 262, 246, 265, 126/266, 43

[56] References Cited

U.S. PATENT DOCUMENTS

| | | | |
|---|---|---|---|
| 1,173,454 | 2/1916 | Nakamizo | 126/262 |
| 2,606,547 | 8/1952 | Stofel | 126/262 |
| 3,262,445 | 7/1966 | Stults et al. | 126/262 |
| 3,513,827 | 5/1970 | Egger | 126/262 |

*Primary Examiner*—James C. Yeung
*Attorney, Agent, or Firm*—Jerome J. Norris

[57] ABSTRACT

A heat producing tear-strip container comprising a container body having a top removeably held by scored lines defined within the periphery of a top portion of the container; a tearing-strip surrounding the bottom portion of said container; a strip of ignitable magnesium metal beneath said tearing-strip and a coated layer of gel containing a mixture of aluminum powder and $Fe_2O_3$ powder directly beneath said ignitable magnesium metal strip.

4 Claims, 1 Drawing Sheet

HEAT PRODUCING TEAR STRIP CONTAINER

FIELD OF THE INVENTION

The present invention relates to cans or containers of tear-strip type for holding foods such as soups, vegetables or meats, and has as its primary object, a container or can which is capable of generating heat sufficient to heat the contents of the can, upon removal of the tear-strip.

BACKGROUND OF THE INVENTION

Tear-strip or rip-strip sheet metal containers are well known, and such containers have long been in use to store or package foods for subsequent use; however, it has been invariably the case that, when foods such as soups or vegetables are store therein, the foods require heating from the outside or a source exterior to the container, upon opening the container by removal of the tear-strip.

These containers have usually been provided with soldered lock and lap side seams, wherein the portion of the seam at the tearing strip is a lap portion. Alternatively, an organic adhesive or cement has been used instead of solder in order to bond together various layers of the side seams.

When using a cemented side seam, it has been advantageous to continue the lock portion of the seam through the tearing-strip area and to interfold or double-up the tearing-strip tongue into the seam as one of the seam hooks, in order to provide for the usual overlap projection of the tongue on the outside of the can to allow engagement of the tongue with a conventional key, in order to remove the tearing-strip to open the can.

However, whether these containers have been provided with soldered lock and lap side seams, or an organic adhesive or a cement to bond together the various layers of the side seams, neither of these techniques are known to allow the contents of the container to be heated from a heating source or heat producing materials that are integral with and form part of the container or can.

SUMMARY OF THE INVENTION

It is an object of the invention to provide a can or container of the tear-strip type for holding foods, wherein upon removal of the tear-strip using a conventional key, a layer of an ignitable metal strip is exposed, and said ignitable strip functions as a hot fuse to burn a belt of a thin film of a gel containing a reducing agent and an oxidant in powder form directly beneath it, to provide a source of glowing heat that is substantially free of smoke and flames.

A further object of the invention is to provide a can or a container of the tear-strip type for holding foods, wherein upon removal of the tear strip using a conventional key, an underlying layer of a magnesium metal strip or ribbon is exposed, and upon igniting said strip with a match, a layer of a gel containing a mixture or blend of iron oxide and aluminum metal powders beneath said strip produces a glowing heating source that is substantially free of smoke and flames.

DETAILED DESCRIPTION OF THE INVENTION

The use of the tear-strip technique of closing cans to render them easily openable when said cans are used to store foods is well known; however, it is not known to use the tear-strip technique to provide means for packaging and sealing a source of heat integral with said cans.

Figure 1:
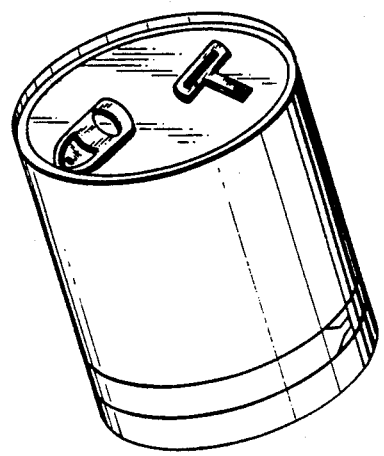
FIG. 1 is a perspective view of a heat producing tear-strip can in accordance with the invention.
Figure 2:
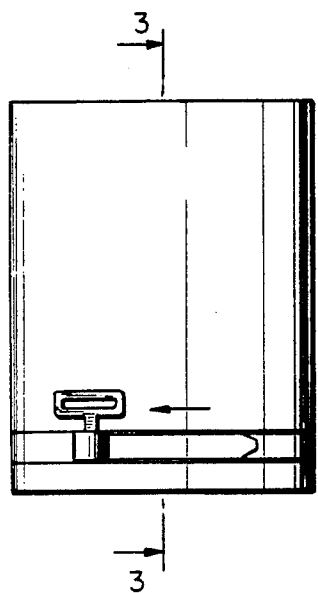
FIG. 2 is a side view in perspective showing a portion of the tear-strip of the can unwound using a conventional key.
Figure 3:
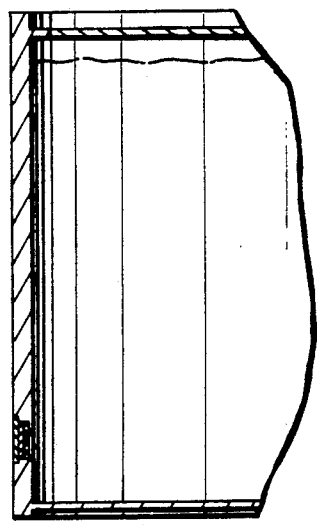
FIG. 3 is a fragmented view of the can of the invention taken along line 3—3 of FIG. 2.
Figure 4:
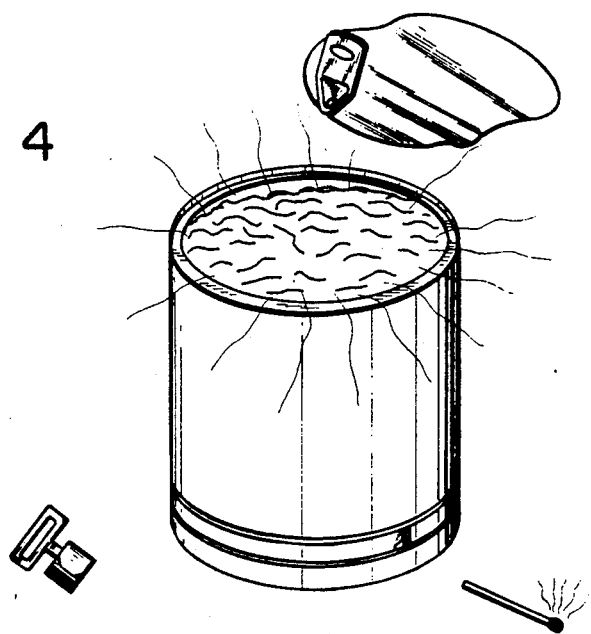
FIG. 4 is a perspective view of the can of the invention after the tear-strip has been unwound and the top removed.

In the present invention, a reference to FIG. 1 shows a can 10 containing a tear-strip having an unsoldered tongue portion 11a which fits into the slot or aperture 12 of soldered or cemented down key 13, when a user desires to commence the process of heating the can prior to removing the top portion 14 by pulling on the handle of anchored loop 16 to separate the top from the can by severing scored or weakened lines 17.

There is disposed directly beneath tear-strip 11, and directly above an underlying strip 21, a layer of an ignitable strip 20, which is made of metal such as magnesium.

When the magnesium strip is ignited by a spark obtained from a source such as a match 30, the burning magnesium ignites underlying strip 21, which is a layer of a gel such as gelating or Sterno(®) containing a mixture of iron oxide ($Fe_2O_3$) and aluminum metal powders, to produce a glowing source of heat that is substantially free of smoke and flames.

In view of the fact that the thermal path of heat will be upwards, it is preferred to place the tear-strip arrangement containing the source of heat providing materials near the bottom of the can in order to provide more proficient heating of the food contents within the can, prior to after removing the top can portion 14.

While the invention has been described with reference to a can in which soups and the like can be stored, it will be readily apparent that the invention is equally applicable for items such as TV dinners and the like, and that many modifications can be made to the disclosure herein, without departing from the spirit and scope of the invention, which is defined by the appended claims.

What is claimed is:

1. A container having a source of heat providing materials sealed integral with said container comprising:
   - a container body having a top removably held by scored lines defined within a periphery of a top portion of said container;
   - a tearing-strip encircling a bottom portion of said container;
   - a strip of an ignitable metal directly under said tearing-strip; and
   - a coated layer of a gel containing a mixture of a reducing agent and an oxidant in powder form directly beneath said ignitable metal strip, wherein said top portion has a key disposed thereon to unwind said tearing-strip and an anchored loop to remove said top portion by severing said scored lines.

2. The container of claim 1, wherein the ignitable metal is magnesium, the reducing agent is aluminum powder and the oxidant is $Fe_2O_3$.

3. A method of heating food contents of a container having a body with a top removably held by scored lines defined within a periphery of a top portion of said container, a tearing-strip encircling a bottom portion of said container, a strip of an ignitable metal directly under said tearing-strip, and a coated layer of a gel containing a mixture of a reducing agent and an oxidant in powder form directly beneath said ignitable metal strip, wherein said top portion has a key disposed thereon to unwind said tearing-strip and an anchored loop to remove said top portion by serving said scored lines, comprising:

removing the key from the top portion of said container;

fitting a slot or aperture in said key on a tongue portion of said tear-strip to remove said tear-strip to expose an ignitable metal strip;

igniting said metal strip to burn said coated layer of a gel containing a mixture of a reducing agent and an oxidant in power form; and removing said top portion of said container by pulling said anchored loop to sever said score lines.

4. The method of claim 3, wherein the ignitable metal is magnesium, the reducing agent is aluminum powder and the oxidant is $Fe_2O_3$.

* * * * *